(12) United States Patent
Borgesen

(10) Patent No.: US 7,650,749 B2
(45) Date of Patent: Jan. 26, 2010

(54) TIDAL POWER STATION DEVICE

(76) Inventor: Are Borgesen, Viljarhaugen 37, Haugesund (NO) N-5538

( * ) Notice: Subject to any disclaimer, the term of this patent is extended or adjusted under 35 U.S.C. 154(b) by 0 days.

(21) Appl. No.: 10/596,289

(22) PCT Filed: Nov. 30, 2004

(86) PCT No.: PCT/NO2004/000367

§ 371 (c)(1),
(2), (4) Date: Jun. 8, 2006

(87) PCT Pub. No.: WO2005/054669

PCT Pub. Date: Jun. 16, 2005

(65) Prior Publication Data

US 2007/0095061 A1    May 3, 2007

(30) Foreign Application Priority Data

Dec. 8, 2003    (NO) ................................. 20035448
Aug. 10, 2004  (NO) ................................. 20043320

(51) Int. Cl.
*F03C 1/00*        (2006.01)
(52) U.S. Cl. ............................. 60/495; 60/496; 290/42; 290/53

(58) Field of Classification Search ........... 60/495–496; 290/42, 53
See application file for complete search history.

(56) References Cited

U.S. PATENT DOCUMENTS

| 3,730,643 | A |   | 5/1973  | Davison |
| 3,857,242 | A | * | 12/1974 | Gilmore ..................... 60/495 |
| 3,887,817 | A |   | 6/1975  | Steelman |
| 4,163,905 | A |   | 8/1979  | Davison |
| 4,170,738 | A |   | 10/1979 | Smith |
| 4,589,344 | A |   | 5/1986  | Davison |
| 6,249,057 | B1 | * | 6/2001  | Lehet ......................... 290/1 R |
| 7,075,191 | B2 | * | 7/2006  | Davison ...................... 290/54 |
| 2004/0093863 | A1 | * | 5/2004 | Huang ......................... 60/495 |

FOREIGN PATENT DOCUMENTS

| DE | 2555120 A1 | 6/1976 |
| GB | 2131490 A  | 6/1984 |

* cited by examiner

*Primary Examiner*—Hoang M Nguyen
(74) *Attorney, Agent, or Firm*—Patricia M. Mathers

(57) ABSTRACT

A tidal power station device (1) in which at least one submerged sail (14, 14') is displaceable between two magazines (18, 20).

21 Claims, 5 Drawing Sheets

TIDAL POWER STATION DEVICE

This invention regards a tidal power station. More particularly, it concerns a tidal power station in which a so-called submerged sail is displaced by the tide between two magazines, whereby the sail is displaced from a first magazine in the direction of a second magazine when the tide flows in a first direction, the sail being displaced in the opposite direction when the tide flows in a second direction.

In this context the term magazine refers to a position in which preferably several sails are located when the tidal flow turns. A sail can be any form of element arranged to be displaced by a tidal stream.

Tidal water represents a form of natural energy that on the whole has not been exploited. Tidal streams occur in many areas around the world and could contribute relatively large amounts of renewable energy if the appropriate equipment was available.

Most known tidal power stations are based on the tide flowing from one reservoir via a turbine to another reservoir located at a lower level. Alternatively, the turbine is located in the actual tidal stream.

It is also known to arrange a number of foils along a pair of endless belts that extend around reversing wheels. Thus, UK Patent Application No. 2 131 491 describes an installation in which the foils have a symmetrical cross section, the foils being fixed between a pair of belts, wherein the foil axes are parallel to the pair of belts.

U.S. Pat. No. 1,522,820 concerns a similar device, but in which there is provided a number of vanes that pivot between an active open position when being displaced with the stream of water, and an inactive collapsed position when being displaced against the stream. The device is dependent on the fluid flowing from one direction relative to the power station, thus it is hardly suited for use as a tidal power station.

EP Patent Application no. 0 135 748 describes a device in which the belts extend between deflection rolls at right angles to the direction of flow, where a number of foils suspended from the belts in an articulated manner cause the belts to turn the deflection rolls when fluid flows past the foils.

Common to prior art is the fact that foils or vanes are attached, rigidly or in an articulated manner, to belt-like elements extending around at least two deflection rolls. It has turned out that installations according to prior art suffer from one or more disadvantages, such a relatively high produced energy cost, operational problems or limited efficiency.

The object of the invention is to remedy or reduce at least one of the disadvantages of prior art.

The object is achieved in accordance with the invention, by the characteristics stated in the description below and in the following claims.

The invention is implemented by at least one submerged sail being displaced between two magazines.

The submerged sail is principally stationary on a path while the tide turns. When the tide flows in a first direction, the sail is displaced along the path in a direction from a first magazine to a second magazine. The sail may reach the limit of travel along the path before the tidal stream turns, or it may stop at a position along the path. When the tide flows in an opposite, second direction, the sail is displaced back along the path in a direction from the second magazine to the first magazine.

Energy can be produced by decelerating the velocity of flow of the sail relative to the velocity of the tidal stream. Calculations show that a good efficiency can be obtained when the velocity of the sail is in the order of a third of the velocity of flow.

In one embodiment a plurality of sails is associated with belt-like elements, hereinafter denoted belt wires, which run between two reversing disks. The belt wires form the path of the sails. In a starting position the sails are packed together in a first magazine. When the tide flows in a first direction, the tidal stream draws a first sail out of the first magazine, whereby the first sail connects to the belt wires. This way the first sail will cause the belt wires to be driven around their respective reversing disks.

After the first sail has been displaced a distance along its path, the tidal stream draws out a second sail which also connects to the belt wires. Then new sails, which also connect to the belt wires, are drawn out sequentially from the first magazine, the sails together pulling the belt wires along.

The sails are displaced along their path until they arrive at the second magazine or the tidal stream diminishes in strength. When the tidal stream turns and flows in the opposite direction, the sails are similarly pulled in the direction from the second magazine to the first magazine.

The device of the invention may advantageously be placed at depths where it will not be an obstacle to shipping. The tidal power station is comparatively simple to install and may be dimensioned to give the highest possible efficiency at the installation site. The sails may have an area of up to several hundred square metres.

Preferably the device comprises enough sails to ensure that the path of the sails is filled with sails while the velocity of the tidal stream is sufficient to drive the sails.

Alternative embodiments of the tidal power station may for instance comprise separate guide and belt wires, or possibly paths on the seabed or added onto a vessel. The sails may be formed such that they attach to different parts of the belt wires according to the direction in which the sails are being displaced. By doing so, the reversing disks will rotate in the same direction regardless of which direction the sails are being moved.

The following describes a non-limiting example of a preferred embodiment illustrated in the accompanying drawings, in which.

Figure 1:
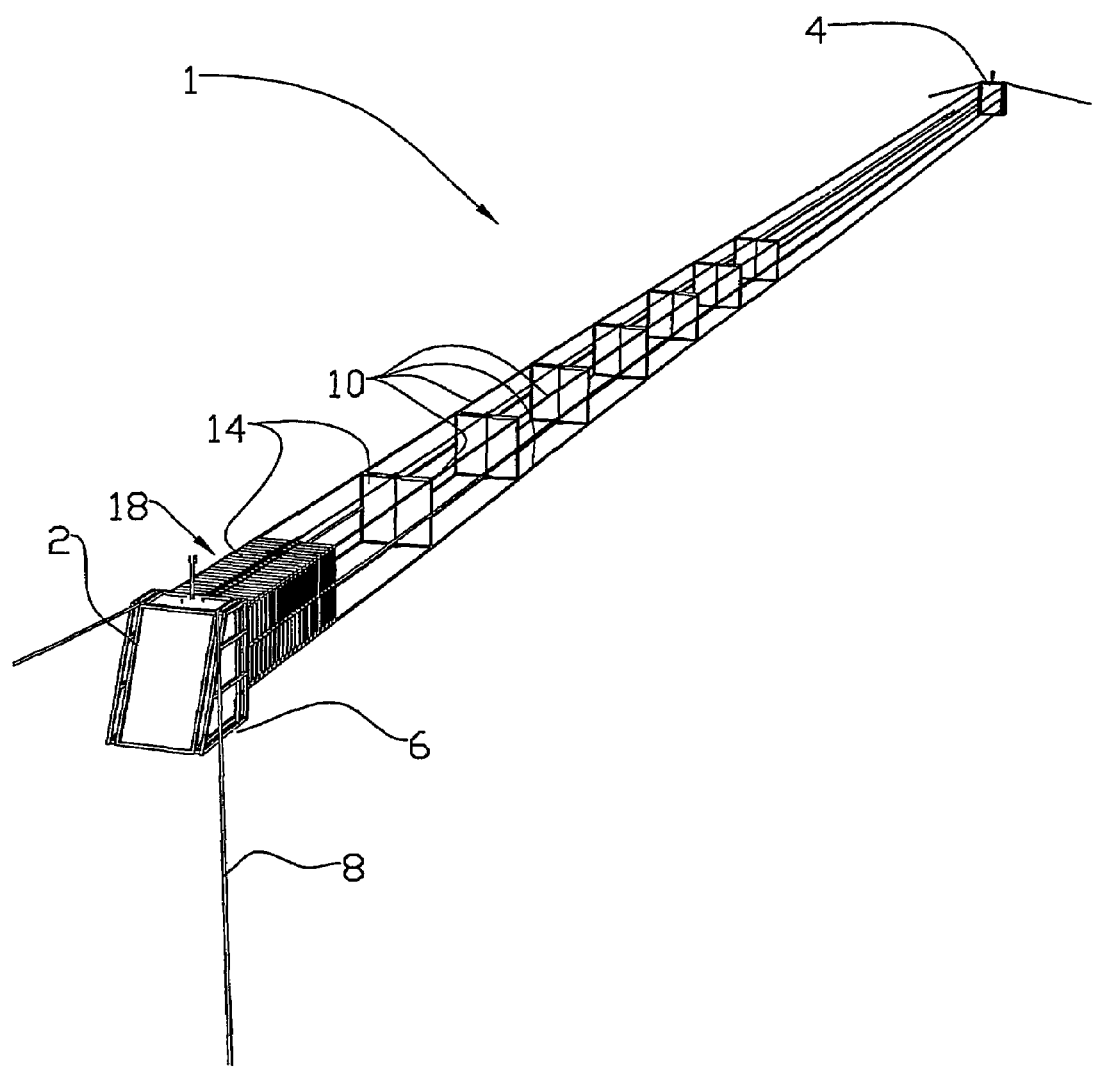
FIG. 1 is a perspective view of a tidal power station according to the invention.

In the drawings reference number 1 denotes a tidal power station comprising a first cage 2 and a second cage 4. The cages 2, 4 are placed on the seabed 6 and are stabilized by means of guys 8.

Figure 2:
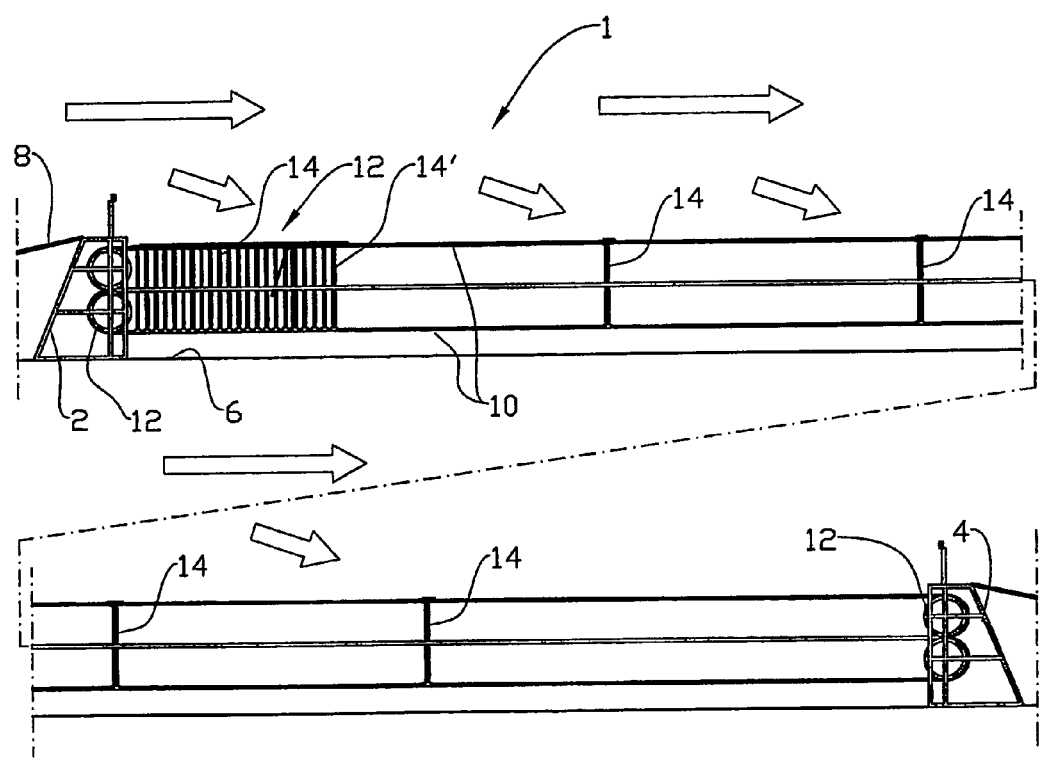
FIG. 2 is a schematic side view of the invention, where several sails are moving along their path and new sails are being moved out of a first magazine. Arrows indicate the direction of flow of the water.
Figure 3:
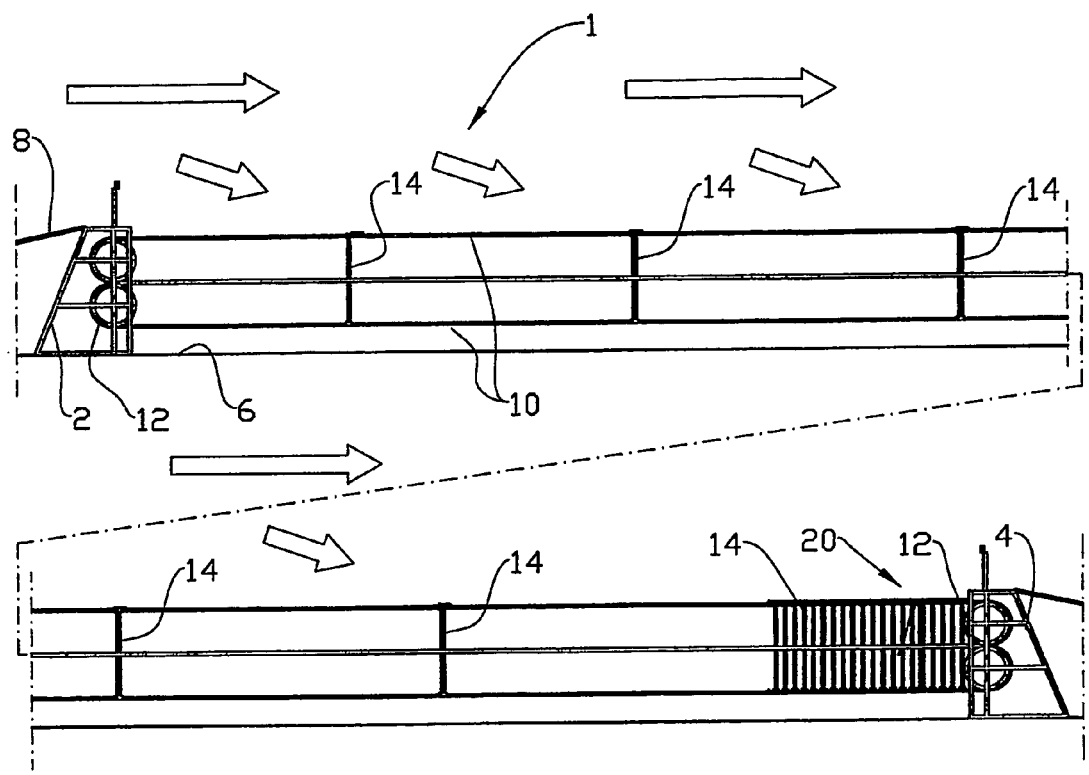
FIG. 3 shows the same as FIG. 2, but here most of the sails have been displaced into a second magazine.
Figure 4:
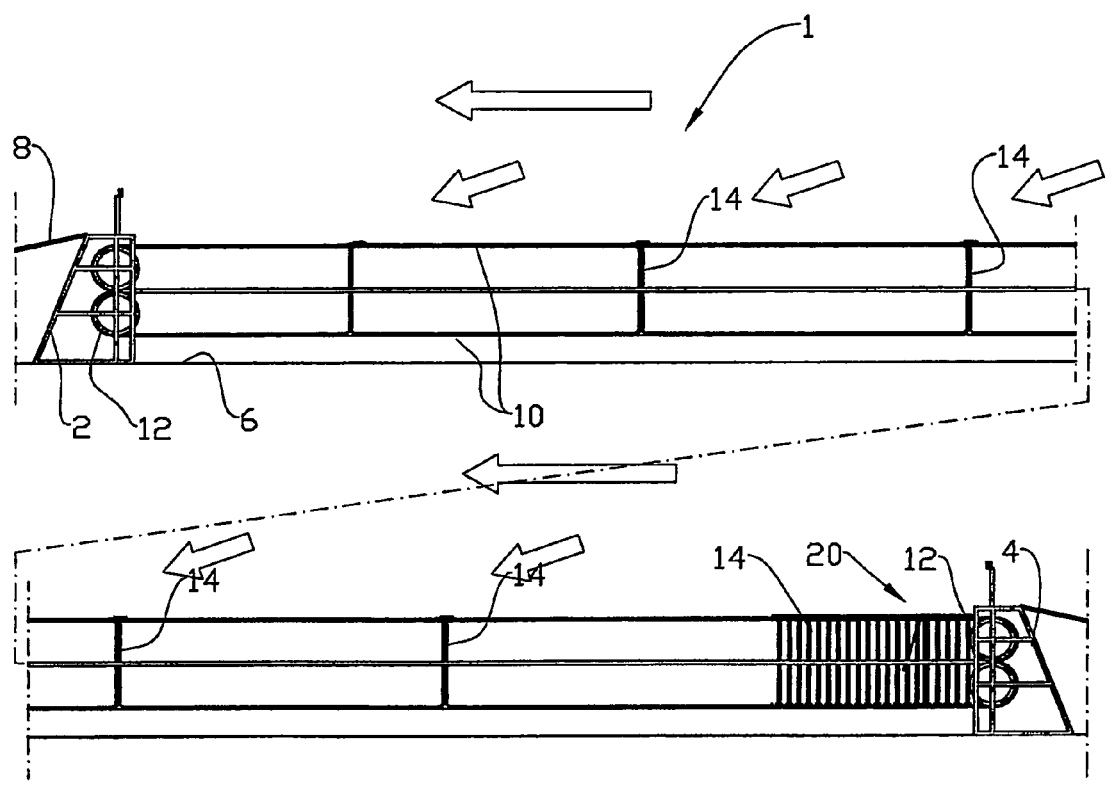
FIG. 4 shows the same as FIG. 2, but here the direction of the tidal stream has turned and the sails are about to be displaced out of the second magazine.

Four belt-like elements 10 in the form of belt wires run freely around reversing disks 12 between the cages 2, 4, see FIG. 2. The belt wires 10 are pretensioned and therefore tight.

Figure 5:
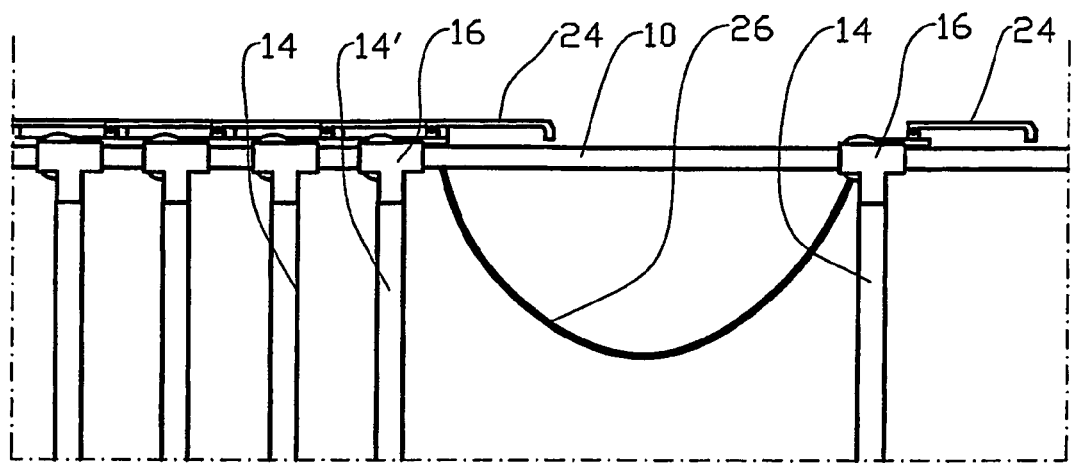
FIG. 5 is a schematic diagram of the interlocking device of the sails, shown in a larger scale.

A number of sails 14 are provided in the tidal power station 1, the sails 14 at their cornerportions comprising guides 16, see FIG. 5. In the inactive position the guides 16 can be displaced along respective belt wires 10. When the sails 14 are packed into a first magazine 18 at the first cage 2 or into a second magazine 20 at the second cage 4, the belt wires can essentially move freely in the guides 16.

Each sail 14 comprises a substantially impervious surface that fills the cross sectional area between the belt wires 10. In the embodiment shown the sails 14 are executed in a two-part form and provided with a vertical hinge shaft 22, the two halves of the sail 14 being, to a limited degree, mutually rotatable about the hinge shaft 22.

Figure 6:
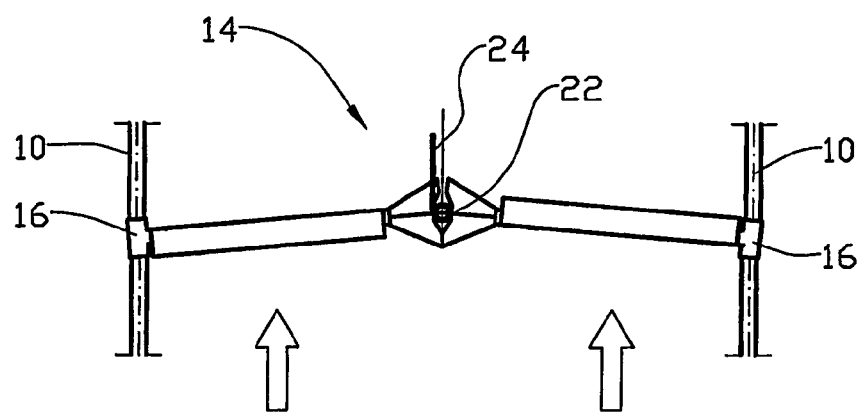
FIG. 6 is a plan view of a sail, also shown in a larger scale.

When the sail 14 is actuated by the tidal stream, indicated by arrows in FIG. 6, the sail assumes a slight V-shape, whereby the guides 16 of the sail 14, through being inclined relative to the belt wire 10, grip the respective belt wires 10, thus pulling the belt wires 10 along.

If so desired, the guides 16 may be provided with additional grippers (not shown).

Each sail 14 is provided with a locking device 24 in the form of a locking arm designed to latch a sail 14 to an adjacent sail 14, see FIG. 5. The locking arm 24 is released by tensioning a distance line 26 between adjacent sails 14. Thus the length of the distance line 26 determines the feed-out distance between the sails 14.

In FIG. 2 a number of sails 14 have been displaced out of the first magazine 18, pulling the belt wires 10 along. The remaining sails 14 in the first magazine 18 are prevented from leaving the first magazine 18 by locking arms 24 holding the sails 14 back. In FIG. 5 the distance line 26 to a foremost sail 14' in the first magazine 18 is about to be tensioned, thereby releasing the locking arm 24 for the sail 14' in question through the locking arm 24 rotating about its suspension shaft (not shown). This allows the sail 14' to be displaced out of the first magazine 18 and grip the belt wire 10.

Further sails 14 are displaced sequentially out of the first magazine 18 towards the second magazine 20. As the tidal stream displaces sails 14, 14', the sails 14 that have travelled the distance between the cages 2, 4 congregate in the second magazine 20.

When the tidal stream turns, the sails 14, 14' are similarly fed out from the second magazine 20 and displaced in the opposite direction towards the first magazine 18, also pulling the belt wires 10 along.

The reversing disks 12 thereby rotate in different directions according to the direction of the tidal flow. One or more of the reversing disks 12 are connected to an electric generator (not shown).

The invention claimed is:

1. A tidal power station device for exploiting energy from a tidal flow, said tidal power station device comprising:
   a first anchor means anchored at a first location and a second anchor means anchored at a second location that is a distance from said first location, said first location and said second location being submerged in a body of water having a tidal flow;
   a sail submerged in said body of water; and
   a transport means having a first end at said first anchor means and a second end at said second anchor means, said transport means for transporting said sail along a path between said first end and said second end and for coupling to an electric generator;
   wherein, when said tidal flow flows in a first direction, said sail is forced along said path by said tidal flow in said first direction, and when said tidal flow flows in a second direction that is reverse of said first direction, said sail is forced along said path by said tidal flow in said second direction.

2. The tidal power station device of claim 1, said transport means comprising:
   a set of rotatable disks that includes a first rotatable disk provided at said first end and a second rotatable disk provided at said second end; and
   a belt-like element that runs over said first rotatable disk and said second rotatable disk;
   wherein said sail is coupled to said belt-like element so as to exert a force on said belt-like element when said sail is forced along said path, thereby forcing said belt-like element to travel about said set of rotatable disks.

3. The tidal power station device of claim 2, wherein said sail has a guide that couples with said belt-like element and wherein, when said sail is inactive and is not being transported along said path, said belt-like element runs freely through said guide.

4. The tidal power station device of claim 3, wherein said sail has a plurality of attachment portions, with said guide attached at each of said attachment portions;
   wherein said belt-like element includes a plurality of belt-like elements, and said set of rotatable disks includes a plurality of first sets and second sets, said plurality of belt-like elements and said plurality of first sets and second sets corresponding in number to said plurality of said attachment portions;
   wherein said guide is coupled to a corresponding one of said belt-like elements; and
   wherein, when said sail is being forced along said path, said plurality of guides exert a force on said corresponding plurality of belt-like elements, so as to force said belt-like elements to travel about said corresponding plurality of sets of rotatable disks.

5. The tidal power station device of claim 1 further comprising a vertical hinge shaft, wherein said sail is constructed as a two-part form comprising a first part and a second part, said first part and second part each having an outer portion that is attached to said belt-like element and an inner portion that is coupled to said vertical hinge shaft, and wherein said tidal flow forces said first part and said second part to rotate about said vertical hinge shaft, so as to form a V-shaped sail to said tidal flow.

6. The tidal power station device of claim 1, further comprising a locking means for locking said sail in an inactive position in which said sail is not being transported along said path, wherein said locking means engages with a locking-means detente on an adjacent sail and prevents said sail from being transported along said path until a releasing force is exerted on said locking means.

7. The tidal power station device of claim 6, wherein said sail includes a plurality of sails, each sail of said plurality of sails having a distance line that connects said each sail to an adjacent sail, and wherein, when a first sail is transported along said path, said adjacent sail remains in said inactive position until said distance line between said first sail and said adjacent sail exerts a tension force that corresponds to said releasing force on said adjacent sail, thereby releasing said locking means from said adjacent sail.

8. The tidal power station device of claim 6, wherein said anchor means is a cage that is anchored in a bed surface in said body of water by an anchor wire, wherein said transport means is anchored in said cage, and wherein said sail includes a plurality of sails that are stored in an inactive state in front of said cage.

9. The tidal power station device of claim 8, wherein said plurality of sails are gathered into a first magazine when said tidal flow transports said sails in said second direction and into a second magazine, when said tidal flow transports said sails in said first direction.

10. The tidal power station device of claim 9, wherein said plurality of sails includes a number of sails that is sufficient that, when said distance line of each sail is fully extended, said sails and distance lines fill said path.

11. The tidal power station device of claim 1, wherein said sail is constructed of an impervious material.

12. A tidal power station device for exploiting energy from a tidal flow, said tidal power station device comprising:
a first anchor means anchored at a first location and a second anchor means anchored at a second location that is a distance from said first location, said first location and said second location being submerged in a body of water having a tidal flow;
a plurality of sails submerged in said body of water, said plurality of sails being stored in an inactive state in a first magazine provided at said first anchor means and alternatively in a second magazine provided at said second anchor means; and
a transport means having a first end at said first anchor means and a second end at said second anchor means, said transport means for transporting said sails along a path between said first end and said second end and for coupling to an electric generator;
wherein, when said tidal flow flows in a first direction, said sails are forced along said path by said tidal flow in said first direction, and when said tidal flow flows in a second direction that is reverse of said first direction, said sails are forced along said path by said tidal flow in said second direction; and
wherein said plurality of sails are pushed into said first magazine when said tidal flow transports said sails in said second direction and into said second magazine, when said tidal flow transports said sails in said first direction.

13. The tidal power station device of claim 12, said transport means comprising:
a set of rotatable disks that includes a first rotatable disk provided at said first end and a second rotatable disk provided at said second end; and
a belt-like element that runs over said first rotatable disk and said second rotatable disk;
wherein said sail is coupled to said belt-like element so as to exert a force on said belt-like element when said sail is forced along said path, thereby forcing said belt-like element to travel about said set of rotatable disks.

14. The tidal power station device of claim 12, wherein said sail has a guide that couples with said belt-like element and wherein, when said sail is inactive and is not being transported along said path, said belt-like element runs freely through said guide.

15. The tidal power station device of claim 14, wherein said sail has a plurality of attachment portions, with said guide attached at each of said attachment portions;
wherein said belt-like element includes a plurality of belt-like elements, and said set of rotatable disks includes a plurality of first sets and second sets, said plurality of belt-like elements and said plurality of first sets and second sets corresponding in number to said plurality of said attachment portions;
wherein said guide is coupled to a corresponding one of said belt-like elements; and
wherein, when said sail is being forced along said path, said plurality of guides exert a force on said corresponding plurality of belt-like elements, so as to force said belt-like elements to travel about said corresponding plurality of sets of rotatable disks.

16. The tidal power station device of claim 15, wherein said sail is rectangular in shape and wherein said attachment portions are disposed at four outer corners.

17. The tidal power station device of claim 12, further comprising a vertical hinge shaft, wherein said sail is constructed as a two-part form comprising a first part and a second part, said first part and second part each having an outer portion that is attached to said belt-like element and an inner portion that is coupled to said vertical hinge shaft, and wherein said tidal flow forces said first part and said second part to rotate about said vertical hinge shaft, so as to form a V-shaped sail to said tidal flow.

18. The tidal power station device of claim 12, further comprising a locking means for locking said sail in an inactive position in which said sail is not being transported along said path, wherein said locking means engages with a locking-means detente on an adjacent sail and prevents said sail from being transported along said path until a releasing force is exerted on said locking means.

19. The tidal power station device of claim 18, wherein each sail of said plurality of sails has a distance line that connects said each sail to an adjacent sail, and wherein, when a first sail is transported along said path, said adjacent sail remains in said inactive position until said distance line between said first sail and said adjacent sail exerts a tension force that corresponds to said releasing force on said adjacent sail, thereby releasing said locking means from said adjacent sail.

20. The tidal power station device of claim 12, wherein each said first and second anchor means are constructed respectively as a first cage and a second cage, each cage being anchored in a bed surface in said body of water by an anchor wire, wherein said transport means is anchored in said first cage and in said second cage, and wherein said first magazine comprises one or more of said plurality of sails stacked up in front of said first cage and said second magazine comprises one or more of said plurality of sails stacked up in front of said second cage.

21. A tidal power station device for exploiting energy from a tidal flow, said tidal power station device comprising:
a first anchor means anchored at a first location and a second anchor means anchored at a second location that is a distance from said first location, said first location and said second location being submerged in a body of water having a tidal flow;
a sail submerged in said body of water; and
a transport means having a first end at said first anchor means and a second end at said second anchor means, said transport means for transporting said sail along a path between said first end and said second end and for coupling to an electric generator, said path extending substantially as a straight path between said first anchor means and said second anchor means;
wherein, when said tidal flow flows in a first direction, said sail is forced along said path by said tidal flow in said first direction, and when said tidal flow flows in a second direction that is reverse of said first direction, said sail is forced along said path by said tidal flow in said second direction.

* * * * *